Patented Dec. 9, 1924.

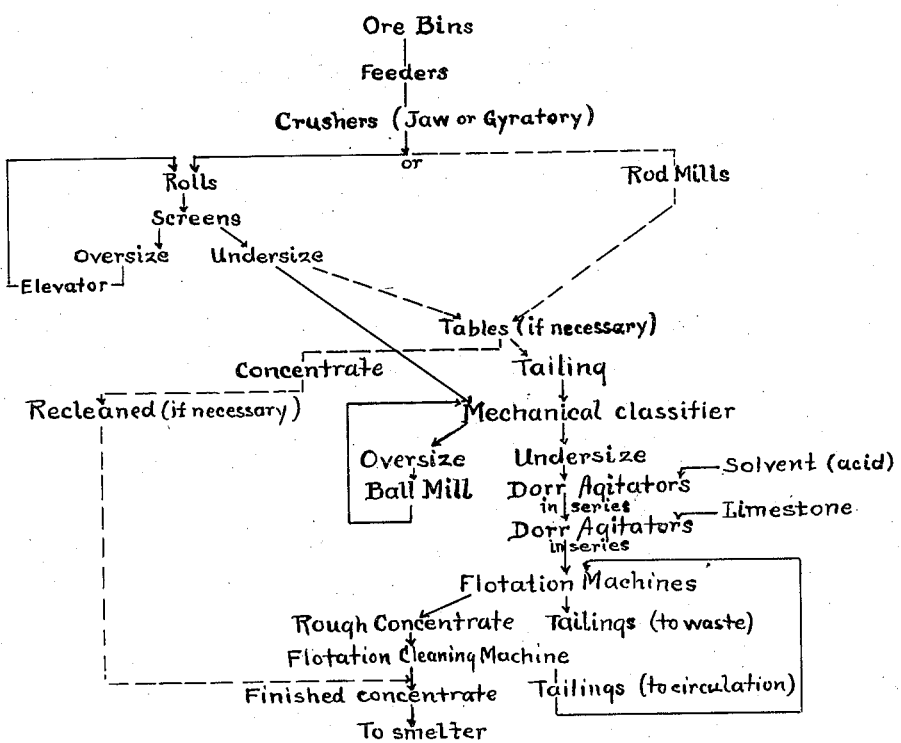

1,518,828

UNITED STATES PATENT OFFICE.

EDWIN B. THORNHILL AND HECTOR G. S. ANDERSON, OF HURLEY, NEW MEXICO, ASSIGNORS TO THORNHILL-ANDERSON COMPANY, OF MUSKOGEE, OKLAHOMA, A CORPORATION OF OKLAHOMA.

PROCESS FOR RECOVERY OF COPPER FROM ORES THEREOF.

Application filed November 6, 1922. Serial No. 599,254.

*To all whom it may concern:*

Be it known that we, EDWIN B. THORNHILL and HECTOR G. S. ANDERSON, citizens of the United States, residing at Hurley, county of Grant, and State of New Mexico, have invented a new and useful Process for Recovery of Copper from Ores Thereof, of which the following is a specification.

This invention relates to the recovery of copper from ores containing oxidized copper compounds as well as sulfides of copper. Nearly all copper ores contain some copper in oxidized form, together with sulfides of copper. The sulfide constituents are readily recoverable in an economical manner by concentration by the flotation processes with or without gravity concentration. The oxidized constituents (carbonates, silicates, etc.) are recoverable by leaching operation, followed by precipitation or by electrode deposition, provided the content in oxidized copper is sufficiently high. In copper ores containing one-half pound up to five pounds, more or less acid soluble copper, (copper in the form of oxidized copper compounds), it would not ordinarily be an economical procedure to provide any special method for recovering this acid soluble copper in addition to the gravity concentration and flotation used for recovery of the sulfide copper. That is to say, assuming that the sulfide content of the ore is sufficient to enable concentration by tables, etc., and by flotation to be economically effected, it would not be economical to install and operate additional apparatus for carrying on a special process for recovery of the oxidized content of the ore when it contains less than five pounds per ton of such copper in oxidized form. On the other hand, if no provision is made for special treatment of the ore, then using the ordinary gravity concentration and flotation operation, not over twenty per cent of the oxidized copper content of the ore would generally be recovered, particularly if this oxidized or acid soluble copper is in the form of carbonates.

The main object of the present invention is to provide for economical recovery of such oxidized or acid soluble copper ore along with the sulfide content of the ore, without involving any considerable expense in addition to the ordinary expense of the gravity concentration and flotation.

We have found that when the oxidized or acid soluble copper content of the ore is less than five pounds per ton, and when the ore has been crushed by the use of grinding media consisting of metallic iron balls, rods, etc., that sufficient metallic iron is transferred to the pulp produced in the grinding apparatus, and consisting of finely divided ore and water, to precipitate the acid soluble copper, in case it is brought into solution in the pulp. We have discovered that the finely ground metallic iron introduced into the pulp by the grinding machines is efficient for precipitating purposes, and that the copper so precipitated is as amenable to recovery from the pulp by subsequent flotation, as is that precipitated by say sponge iron, on account of the fact that it is so finely divided, probably mostly passing 200 mesh. According to our invention, the ore is agitated in contact with acid after it has been finely ground in apparatus using iron grinding surfaces or media so as to thereby effect solution of the oxidized or acid soluble copper content and precipitation of copper from such solution in metallic form such precipitated copper being subsequently recovered by flotation along with the copper sulfide content of the ore.

Accompanying drawing is a flow sheet illustrating one embodiment of the process.

If the ore is ground to pass, say 65 mesh, it will then be a size which can be readily agitated by modern agitating equipment and also be of a size which will be subject to comparatively quick dissolution of the copper values by sulfuric acid or other reagents capable of dissolving copper in this form. Therefore, this acid soluble copper can be quickly and readily dissolved in fifteen minutes, more or less, by sulfuric acid, so that practically all of the copper in the acid soluble form is dissolved in this time. From our experience, we have determined that 90% of the acid soluble copper in an ore of average grade is dissolved in the first ten minutes after the acid is added.

Where rod mills and ball mills are used for grinding, or other grinding machines using iron or steel as grinding media, the attrition of the ore on the rods, balls and liners, will result, in the case of an average ore, in transferring five pounds of iron more or less, per ton of ore, from the grinding media to the ore pulp. (This transferred iron is not capable of removal from the pulp, to any considerable extent, by magnetic separation, on account of the fact that it is so very finely divided. Tests have demonstrated that about five per cent of this finely divided iron can be removed by magnetic separation.)

Since the amount of copper that can be precipitated from copper sulfate solution by a pound of pure iron is, theoretically, 1.12, the five pounds of iron above stated should precipitate approximately 5.6 pounds of copper. Therefore, it would not be necessary on an ore containing say four pounds of copper in acid soluble form, to add from extraneous sources any more, or very little, if any, iron in a finely divided form, thus saving that additional expense.

According to our invention, ores containing small amounts of copper in the acid soluble form as above stated are treated by agitating the ore in contact with acid from ten to thirty minutes subsequent to the time that it has been finely ground in rod mills, ball mills, or other grinding means using balls, rods or other iron or steel grinding media, so that the acid will have sufficient time to dissolve the acid soluble copper. The agitation of the ore with acid may be effected in any suitable apparatus. On account of the fact that the finely divided iron is present in the ore at the time that the acid is added to the ore, more or less simultaneous dissolution of the copper values and precipitation by the finely divided iron present, takes place. The comparative speed of solution of the acid soluble copper is so much greater than the speed of solution of the metallic iron present by the sulfuric acid, that the acid will dissolve the copper with sufficient speed so that the iron will not be materially affected directly by the acid. Therefore, practically simultaneous solution and precipitation of the copper in a finely divided form will take place in the agitating equipment. Limestone, in sufficient excess, is added at the end of the agitation period, in order to neutralize any residual acid present and also to precipitate any ferric sulfate formed, then or subsequently, so that subsequent flotation of this pulp will take place in a neutral rather than an acid or alkaline solution, and prevent the re-solution of any copper by ferric sulfate or acid. The pulp in this condition is then transferred by ordinary means to emulsifying and/or flotation machines, oil being added in sufficient amounts for the purpose of the operation of flotation. In this manner, a substantial recovery of the acid soluble copper can be made by a very small additional cost per ton of ore treated, which cost will be constituted mainly of the cost of agitation and the cost of acid, and thereby a new and important improvement over present methods is instituted.

The agitation of the pulp containing acid soluble copper, should always precede the flotation operation. We have found that this finely divided metallic iron is particularly susceptible to efficient recovery by ordinary flotation, therefore, if the flotation operation preceded the agitating operation, the finely divided iron would be effectively removed from the pulp and would not subsequently be valuable for the precipitation of the dissolved copper.

To illustrate the economy of the described process, we will assume an ore such as provided at the Santa Rita mines in New Mexico, having a total content of 1.20% copper, of which 0.15% is in the acid soluble form. The amount of sulfuric acid necessary to dissolve this acid soluble copper and at the same time satisfy the acid consuming elements of the ore itself during the time required for the operation, is a function of any particular ore under consideration. We have found that an average ore of the stated character, requires, during the short period of agitation, from six to ten pounds to satisfy the acid consuming elements in the ore itself. Assuming that the ore under present consideration requires six pounds at 60° B. acid per ton of ore and adding to this amount the six pounds of 60° B. acid required to dissolve the 0.15% or three pounds of copper in the acid soluble form, the total amount of 60° B. acid required per ton of ore will be twelve pounds. The amount of acid consumption due to the ore itself is largely a function of the time of agitation, or, in other words, the time during which the acid is in contact with the ore. Since, as stated before, we have found that 90% of the acid soluble copper is dissolved during the first ten minutes of contact of the ore with the acid, it is desirable to extend this time as little beyond ten minutes as is possible. An average ore of the kind above referred to, is not a great acid consumer, and the agitation period may be economically extended to from twenty to thirty minutes.

The accompanying flow sheet indicates the manner in which this variation from common practice will operate. It will be noted that the only variation from commonly accepted practice is the addition of the copper solvent a sufficient length of time ahead of the flotation machines to permit efficient solution of the acid soluble copper, precipitation of the copper (which is simultaneous with solution), and neutralization of the excess acid.

What we claim is:

1. The process of recovering copper from ores containing copper in oxidized form, which consists in grinding the ore in the presence of water, by the action of grinding media containing iron, to form a pulp containing the finely divided ore and finely divided metallic iron, adding acid to the ore to dissolve the oxidized copper content of the ore, such dissolved copper being then precipitated by the action of the said finely divided metallic iron, and then neutralizing the pulp and subjecting it to flotation to concentrate the precipitated copper.

2. A process as set forth in claim 1, wherein limestone is used as the neutralizing agent for the pulp. after precipitation of the copper therein.

3. The process or recovering copper from ores containing sulfide copper along with an oxidized copper content of less than five pounds per ton, which consists in grinding the ore with water by the action of iron grinding media, to form a pulp containing the ore in finely divided condition and also containing finely divided iron, adding sufficient acid to the ore to dissolve the oxidized copper content and to satisfy the acid consumption of the ore, aside from its copper content, during the time required for solution of such copper content, causing precipitation of the dissolved copper by the finely divided iron present as aforesaid, neutralizing the pulp and then subjecting it to flotation to concentrate the precipitated metallic copper along with the sulfide copper in the pulp.

In testimony whereof we have hereunto subscribed our names this twenty-seventh day of October, 1922.

EDWIN B. THORNHILL.
HECTOR G. S. ANDERSON.